US006727631B2

(12) United States Patent
Nishimura

(10) Patent No.: US 6,727,631 B2
(45) Date of Patent: Apr. 27, 2004

(54) ROTARY ELECTRICAL MACHINE

(75) Inventor: Shinji Nishimura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/189,466

(22) Filed: Jul. 8, 2002

(65) Prior Publication Data

US 2003/0015931 A1 Jan. 23, 2003

(30) Foreign Application Priority Data

Jul. 23, 2001 (JP) ..................... P2001-220909

(51) Int. Cl.[7] .............................................. H02K 1/22
(52) U.S. Cl. ...................................... 310/266; 310/184
(58) Field of Search ................................ 310/266, 268, 310/261, 112, 113, 114, 184; 29/596–598

(56) References Cited

U.S. PATENT DOCUMENTS

| | | | | |
|---|---|---|---|---|
| 3,555,330 A | * | 1/1971 | Svecharnik | 310/266 |
| 4,532,447 A | * | 7/1985 | Cibie | 310/114 |
| 4,945,296 A | * | 7/1990 | Satake | 318/538 |
| 5,744,895 A | * | 4/1998 | Seguchi et al. | 310/266 |
| 6,093,992 A | | 7/2000 | Akemakou | |
| 6,297,575 B1 | | 10/2001 | Yang | |
| 6,335,606 B1 | * | 1/2002 | Minagawa et al. | 318/801 |
| 6,355,999 B1 | * | 3/2002 | Kichiji et al. | 310/112 |

FOREIGN PATENT DOCUMENTS

| | | | |
|---|---|---|---|
| GB | 660064 | * 11/1951 | 310/113 |
| JP | 7-105929 | 4/1995 | |
| WO | WO 00/31857 | 6/2000 | |

OTHER PUBLICATIONS

Konrad Schoepp and Piotr Zielinski both of Wroclaw University of Technology, Institute of Electrical Machines, Drives and Metrology, ul. Smoluchowskiego 19 50–370 Wroclaw, Poland.

* cited by examiner

Primary Examiner—Burton S. Mullins
Assistant Examiner—Leda T. Pham
(74) Attorney, Agent, or Firm—Sughrue Mion, PLLC

(57) ABSTRACT

A rotary electrical machine is capable of increasing or decreasing a rotating speed of a rotating magnetic field as compared with rotation of a rotor. An armature 1 having an armature coil 4 and a field 2 having a field coil 8 form a stator. A rotor 9 rotates facing magnetic pole faces of the armature 1 and the field 2. The rotor 9 has a first coil 16 that is disposed at a portion facing the field 2 and generates a power by a magnetic field produced by the field 2 and a second coil 17 that is disposed at a portion facing the armature 1 and is supplied with an electric current from the first coil 16 and gives a magnetic field to the armature coil 8. The first coil 16 and the second coil 17 are connected in reversed phase sequence or in the same phase sequence.

19 Claims, 18 Drawing Sheets

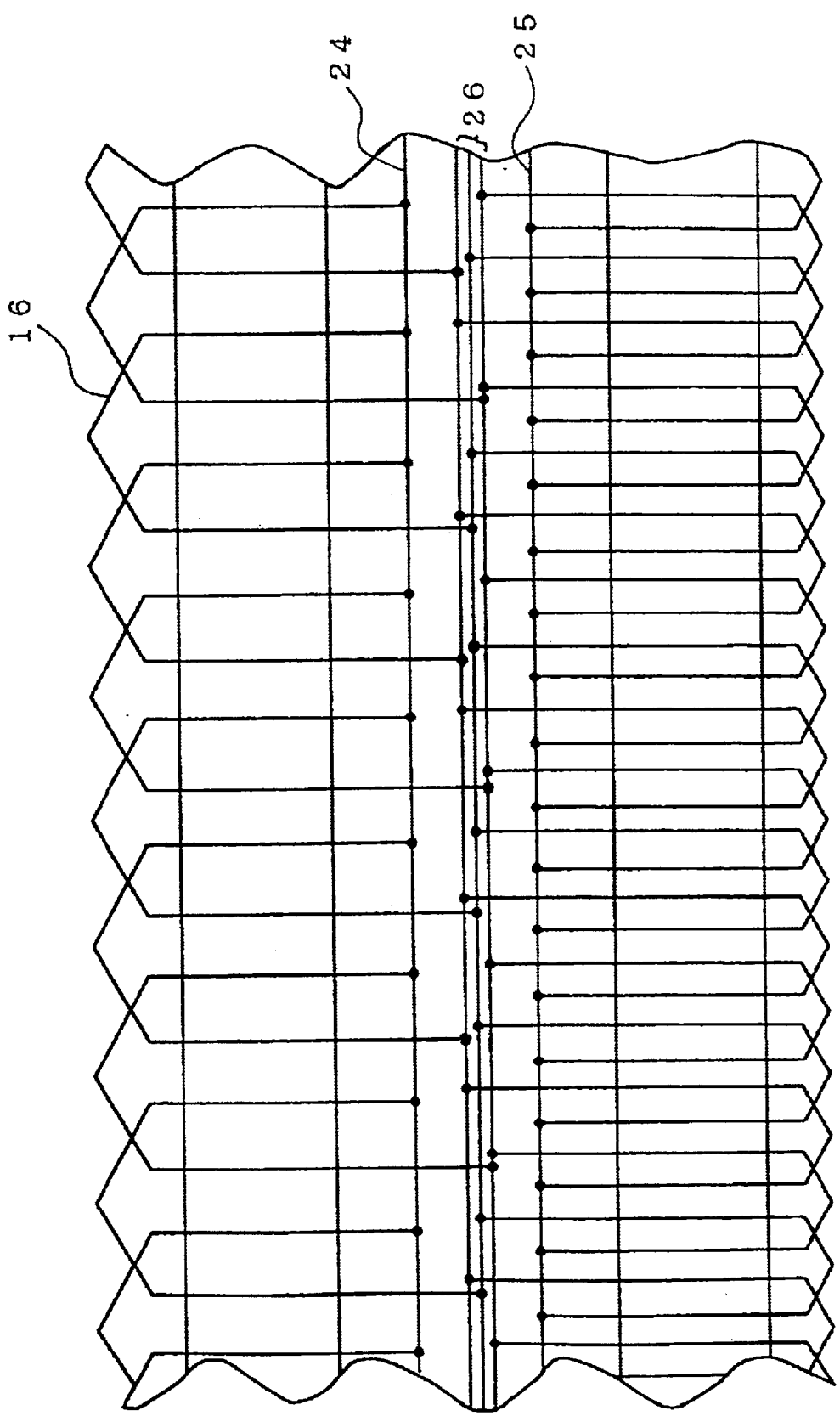

ROTARY ELECTRICAL MACHINE

BACKGROUND OF THE INVENTION

1. Field of the Invention

The present invention relates to a rotary electrical machine capable of obtaining a high output power by rotating a rotating magnetic field at a speed different from a rotating speed of a rotor.

2. Background Art

In a conventional rotating-field type rotary electrical machine such as generator for vehicle or synchronous generator, rotating speed of the magnetic field is equal to the rotating speed of the rotor. The rotating-field type rotary electrical machine requires any slip ring and any brush in order to feed an electric current to a field coil, and the machine cannot be completely maintenance free. A maintenance free rotary electrical machine without slip ring and brush is an inductor-rotating type rotary electrical machine. In the inductor-rotating type rotary electrical machine, an armature and a field coil are fixed, an inductor is disposed between the armature and the field coil, and a rotating magnetic field is brought to the armature by rotating the inductor.

For example, the Japanese Patent Publication (unexamined) No. 15929/1995 discloses an art relating to the mentioned inductor-rotating type rotary electrical machine. In this known art, an inductor serving as a rotor rotates in an air gap formed between a field of a stator magnetized in axial direction and an armature of the same stator, thereby a rotating magnetic field is given to the armature. In such a structure, the slip ring and the brush are not required and the machine is free from maintenance, however, the rotating speed of the rotating field is equal to the rotating speed of the rotor as a matter of course.

In order to obtain a sufficient output power with a small-sized rotary electrical machine, in the case of a generator, for example, it is necessary to increase the rotating speed of the rotor and increase the winding number of the armature coil as compared with a prime mover. Taking the case of a generator for a vehicle as an example, in the rotary electrical machine of a wide normal rotating range, increasing a speed-increasing ratio of the rotor to the prime mover requires that the machine has strength enough to withstand centrifugal force, and there exists a limit in increasing the speed-increasing ratio. As long as the rotary electrical machine is not large-sized, increase in winding number of the armature coil brings about increase in copper loss of the armature coil, and consequently, the temperature rises remarkably, and it is difficult to increase the output power with a small-sized rotary electrical machine.

SUMMARY OF THE INVENTION

The present invention was made to solve the above-discussed problems and has an object of obtaining a rotary electrical machine capable of obtaining a sufficient output power, without increasing any speed of a rotor itself and without increasing any winding number of an armature coil, by rotating a rotating magnetic field at a speed different from a rotating speed of a rotor in a case where the rotary electrical machine is used as a generator.

According to the invention, a rotary electrical machine includes an armature forming a stator, a field forming the stator with the armature, a rotor that rotates facing the armature and the field, a first coil that is disposed at a portion facing the field of the rotor and generates an electric power by means of a magnetic field produced by the field, and a second coil that is disposed at a portion facing the armature of the rotor, supplied with an electric current from the first coil, and brings a magnetic field to the armature. As a result of such arrangement, it is possible to obtain a rotating magnetic field of a rotating speed different from the rotating speed of the rotor from the second coil and use the rotary electrical machine as a generator of high output power or as an electric motor of high torque.

BRIEF DESCRIPTION OF THE DRAWINGS

FIG. 18 is a connection diagram of a rotor winding of the rotary electrical machine according to another embodiment of the invention.

DESCRIPTION OF THE PREFERRED EMBODIMENTS

Embodiment 1

Figure 1:
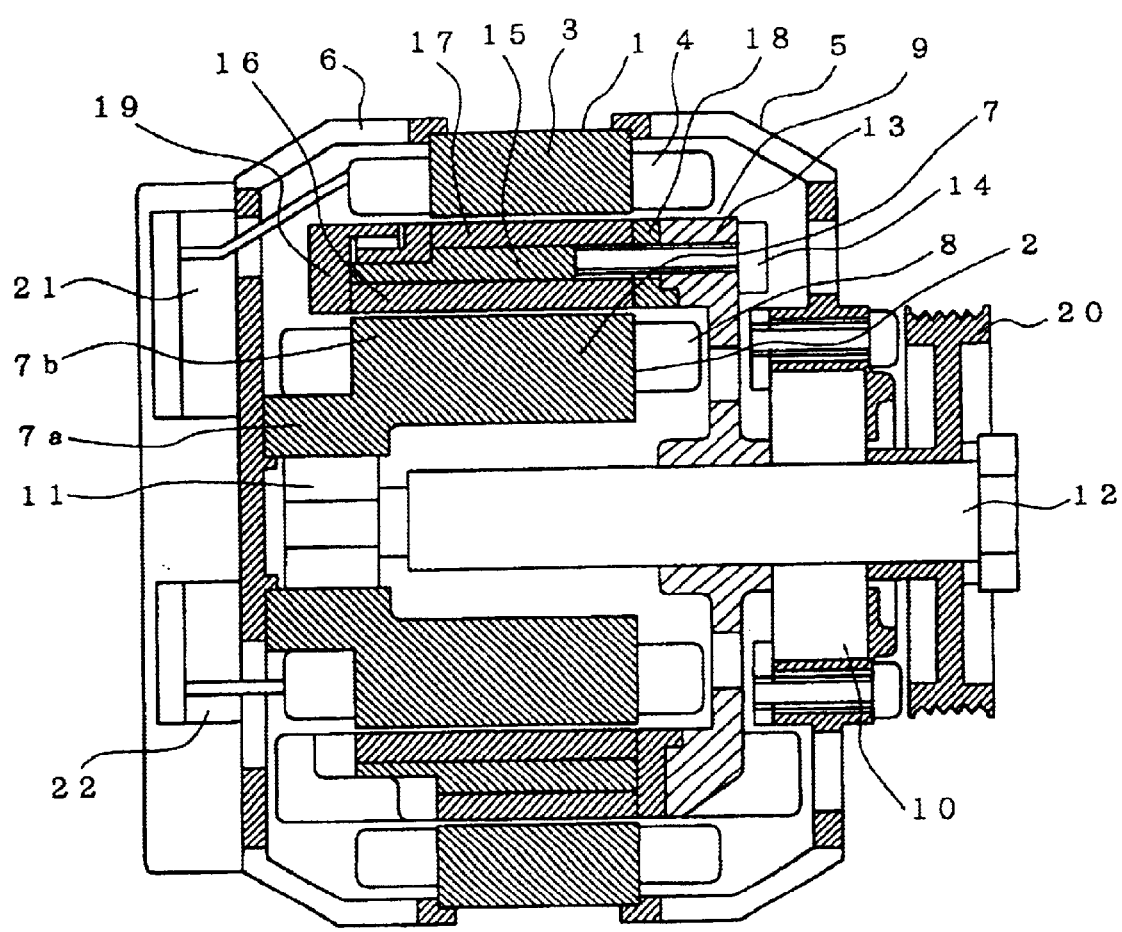
FIG. 1 is a sectional view of a rotary electrical machine according to Embodiment 1 of the invention.
Figure 2:
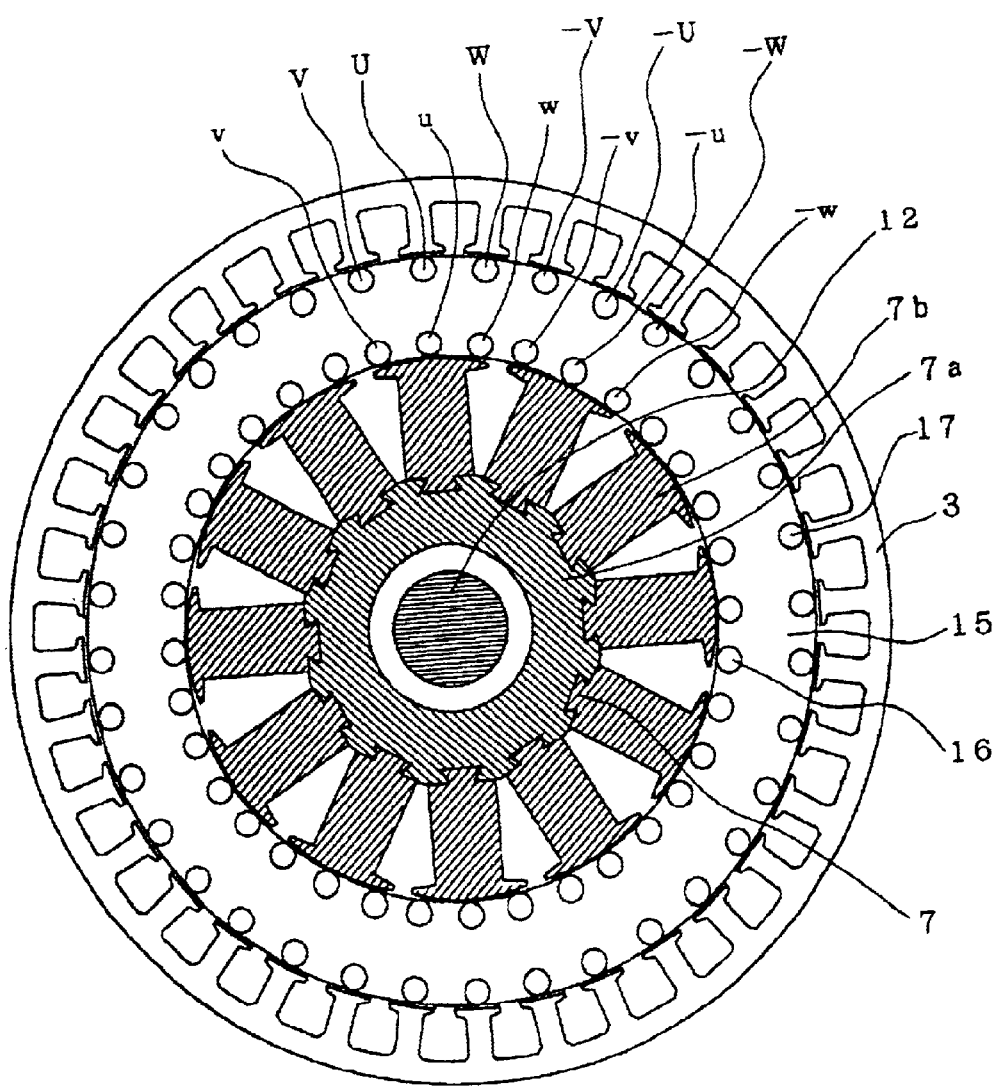
FIG. 2 is a sectional view showing a relation between stator and rotor of the rotary electrical machine according to Embodiment 1 of the invention.
Figure 3:
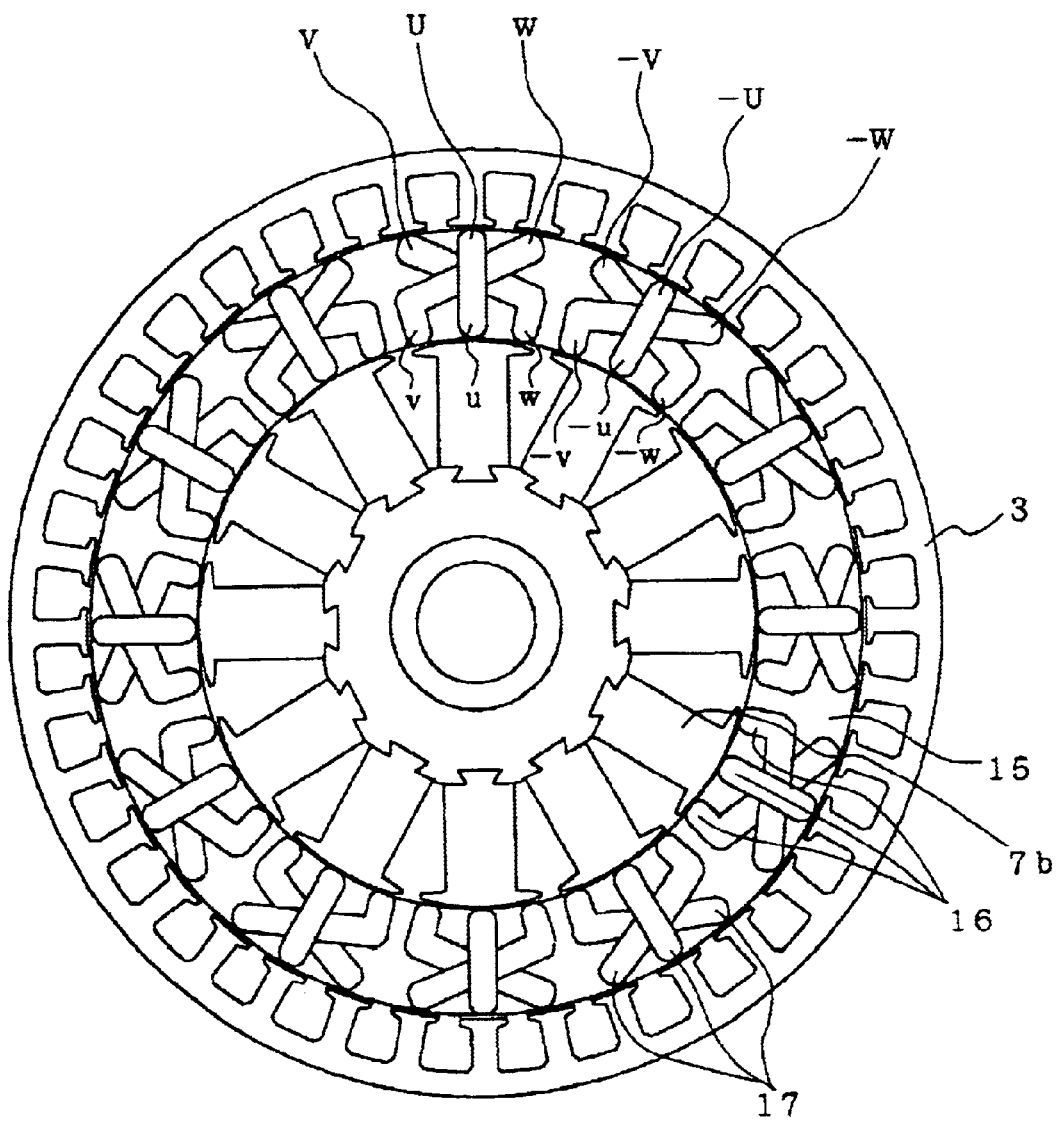
FIG. 3 is an explanatory schematic view showing a connection state of a rotor winding of the rotary electrical machine according to Embodiment 1 of the invention.
Figure 7:
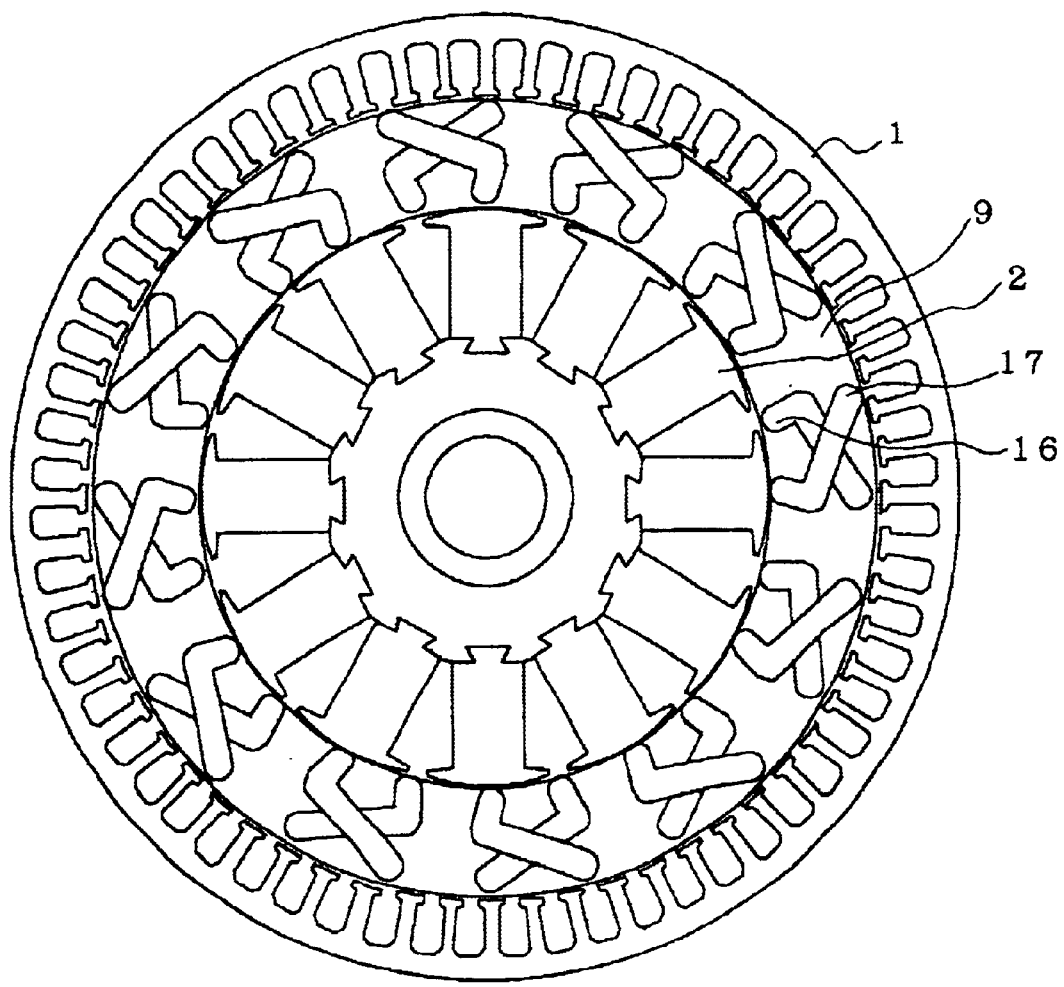
FIG. 7 is an explanatory schematic view showing a modification of the rotary electrical machine according to Embodiment 1 of the invention.
Figure 8:
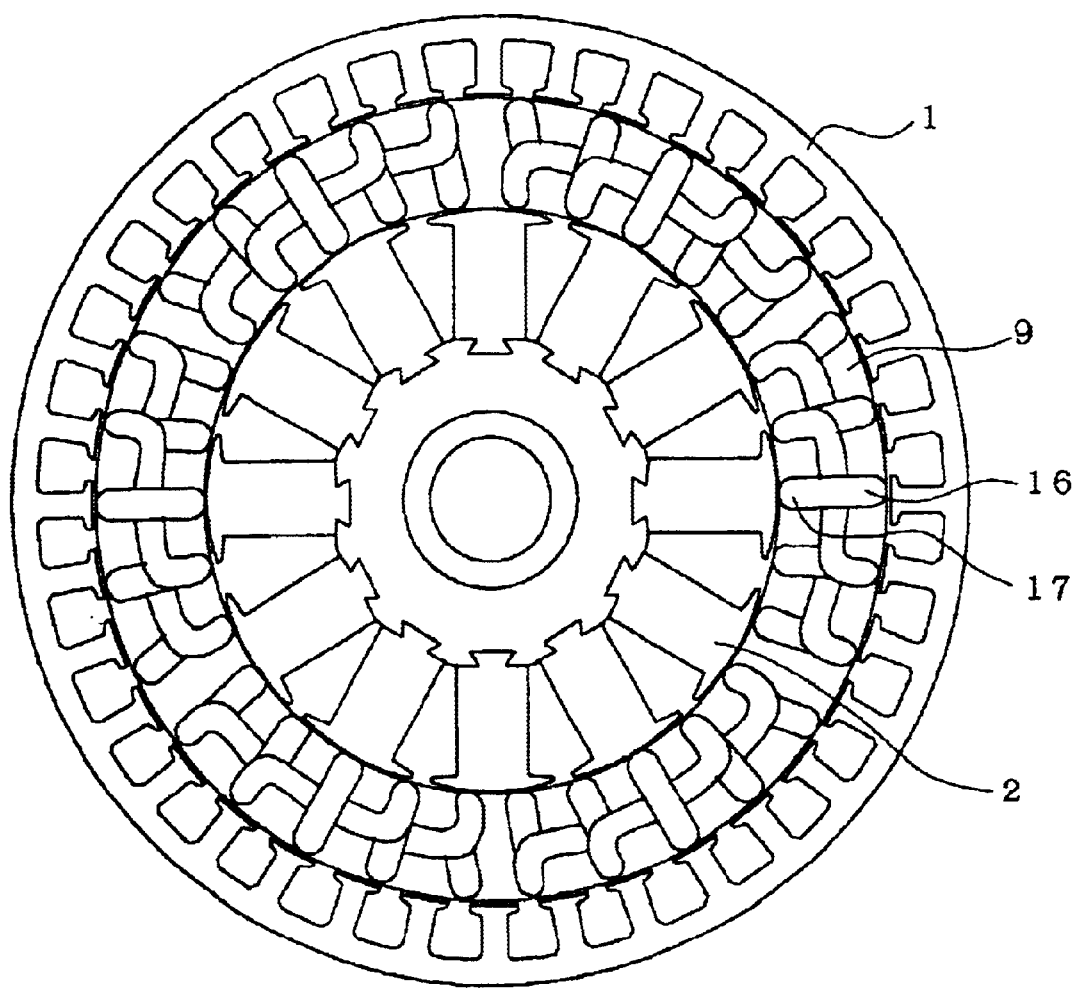
FIG. 8 is an explanatory schematic view showing a modification of the rotary electrical machine according to Embodiment 1 of the invention.
Figure 9:
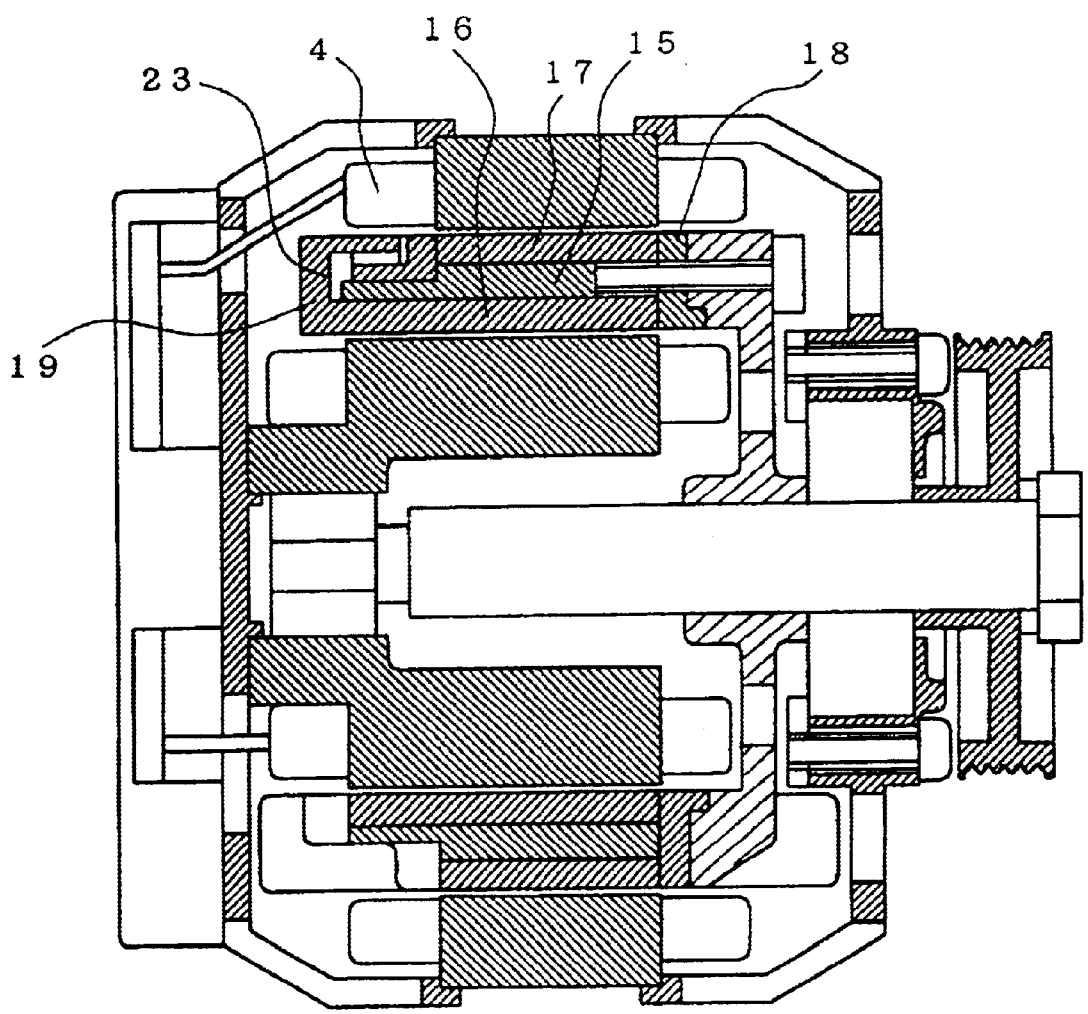
FIG. 9 is an explanatory schematic view showing a modification of the rotary electrical machine according to Embodiment 1 of the invention.

FIGS. 1 to 9 show a structure of a rotary electrical machine according to Embodiment 1 of the invention. FIG. 1 is a sectional view in axial direction, FIG. 2 is a sectional view showing a relation between a stator and a rotor in a direction crossing the axial direction at right angles. FIG. 3 is an explanatory schematic view showing a connecting state of a winding of the rotor in FIG. 2, and FIGS. 4 to 8 are explanatory schematic views showing various modifications according to this embodiment. FIG. 9 is a sectional view showing a modification of FIG. 1 with the rotor coil changed in configuration.

Referring to FIG. 1, the rotary electrical machine is comprised of a stator and a rotor, and the stator is comprised of an armature 1 and a field 2. An armature core 3 of the armature 1 has, for example, a twelve-pole six-phase armature coil 4, and is held between a front bracket 5 and a rear bracket 6. A cylindrical portion 7a of a field core 7 forming the field 2 is fitted to the rear bracket 6, and a field coil 8 is wound round a projecting pole portion 7b of the field core 7. A rotor 9 is comprised of a rotary shaft 12 rotatably supported by a bearing 10 on the front bracket 5 side and a bearing 11 on the rear bracket 6 side, a disk portion 13 fixed to the rotary shaft 12, a rotor core 15 fixed to the disk portion 13 with a screw 14, and a winding of the rotor described later.

The rotor core 15 is disposed on the internal diameter side of the armature core 3 and on the external diameter side of the field core 7 through an air gap so as to be freely rotated by rotation of the rotary shaft 12. As shown in detail in FIG. 2, a first coil (hereinafter referred to as an inner coil) 16 is disposed at a portion facing the field core 7 on the internal diameter side. Further, a second coil (hereinafter referred to as an outer coil) 17 is disposed at a portion facing the armature core 3 on the external diameter side. The inner coil 16 and the outer coil 17 are formed of a bar-shaped non-magnetic electric conductor such as aluminum or copper like a squirrel-cage induction motor, and one end of them is short-circuited by a common short-circuiting ring 18. The other end of the inner coil 16 and the outer coil 17 are connected in a connecting portion 19 as described later. Reference numeral 20 is a pulley mounted on the rotary shaft 12, numeral 21 is a rectifier for rectifying alternating-current output of the armature coil 4, and numeral 22 is a regulator for controlling an electric current of the field coil 8.

The armature coil 4 and the field coil 8 are omitted in FIGS. 2 and 3. The cylindrical portion 7a and the projecting pole portion 7b of the field core 7 are joined together through dovetailing, and it is also preferable that they are integrally formed into one body as a matter of course. A face of the projecting pole portion 7b facing the rotor core 15 is established so that an air gap grows wider as coming near both ends in circumferential direction, and sine-wave voltage is generated at the inner coil 16 of the rotor 9 by such structure. The inner coil 16 and the outer coil 17 of the rotor 9 are arranged so that, for example, six-phase output is obtained for twelve poles formed by the field core 7. As described above, one end of the inner coil 16 and the outer coil 17 of the rotor 9 are short-circuited by the short-circuiting ring 18, and the other end of them are connected in the connecting portion 19 so that the phases are connected in reversed phase sequence.

FIG. 3 shows a state of the mentioned connecting portion 19, which is a side view observed from an end face side of the connecting portion 19. In FIGS. 2 and 3, assuming that respective phases of the inner coil 16 are u-phase, v-phase, w-phase, -u-phase, -v-phase, and -w-phase and respective phases of the outer coil 17 are U-phase, V-phase, W-phase, -U-phase, -V-phase, and -W-phase, as shown in FIG. 3, u-phase is connected to U-phase, v-phase is connected to W-phase, w-phase is connected to V-phase, -u-phase is connected to -U-phase, -v-phase is connected to -W-phase, and -w-phase is connected to -V-phase. As a result of such connection, the field coil 8 is excited by a DC power supply, thereby the rotor 9 being rotated. Thus, an ac current six-phase generating electric current generated at the inner coil 16 of the rotor 9 is supplied to the outer coil 17 in reversed phase sequence, and the armature coil 4 is excited.

The generating current of the inner coil 16 flows so that a magnetic flux in a direction opposite to a magnetic flux linking with the inner coil 16 is generated. The magnetic flux linking with the inner coil 16 is a magnetic flux generated by the field coil 8. As the field coil 8 is fixed, the magnetic flux is generated by the inner coil 16 in a stationary state for the field coil 8 serving as a stator. In other words, the magnetic flux generated by the inner coil 16 rotates in a direction opposite to the rotation of the rotor 9 at the same speed as the rotor 9 rotates. Therefore, a magnetomotive force generated by the current of the outer coil 17 connected to the inner coil 16 in reversed phase sequence rotates in the same direction at the same speed as the rotor 9 rotates.

The magnetomotive force generated by the electric current of the outer coil 17 is approximately equal to that of the field coil 8 and rotates twice as high as the rotating speed of the rotor 9. Accordingly, a rotating magnetic field equivalent to twice as high as the rotation of the field 2 is applied to the armature coil 4, and the rotating speed of the rotating magnetic field is increased without increasing the rotating speed of the rotor 9 itself. Therefore, it is possible to obtain a generator of high output power in which winding number of the armature coil 4 is reduced to a half and increase the output electric current twice. Furthermore, in this generator, winding resistance is reduced to a quarter (winding number is reduced to a half and sectional area is increased twice). In the case of a machine capable of obtaining output power in the same manner as in the conventional machine, it is possible to reduce the rotating speed of the rotor 9 to a half. It is also possible to reduce the speed reduction ratio between the machine and the driving prime mover, small size the machine as a whole, and obtain a rotary electrical machine of small magnetic noise by reducing the magnetic flux quantity. As a result, it becomes possible to obtain a generator having various characteristics.

Figure 4:
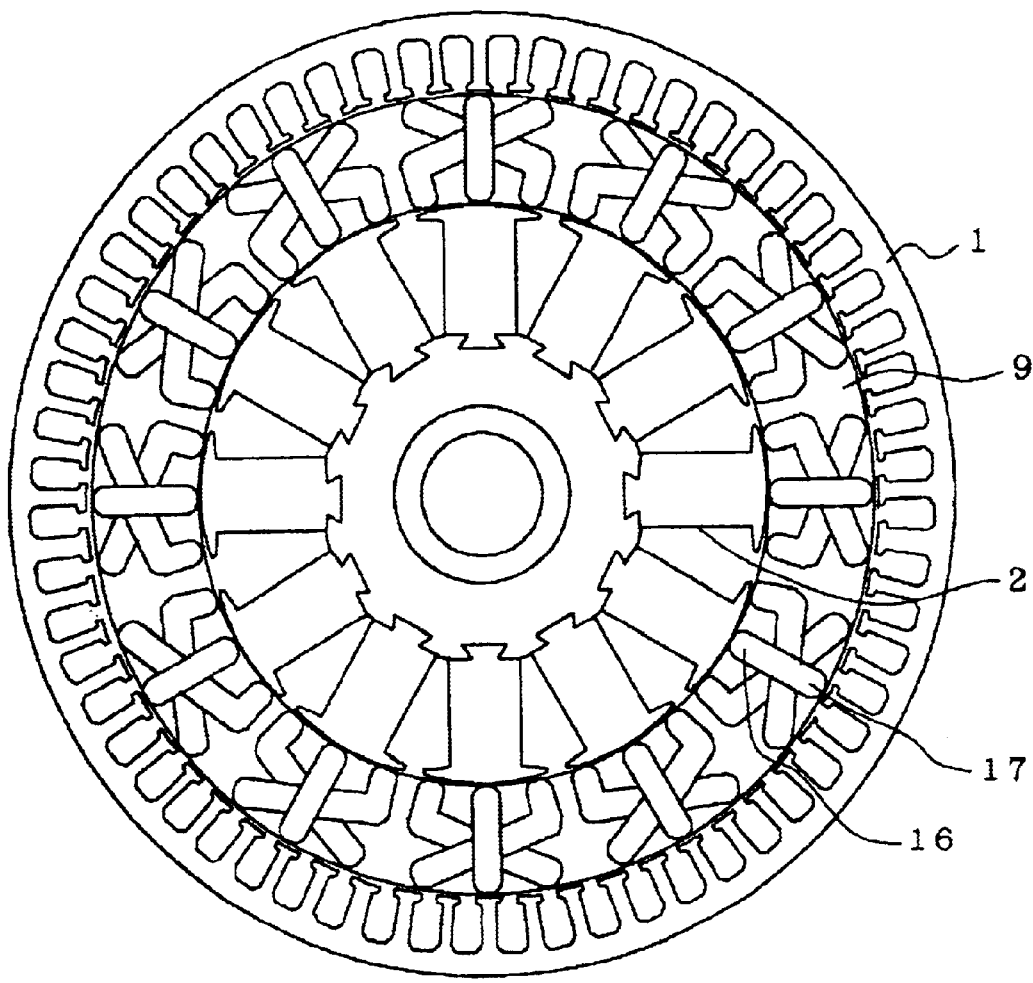
FIG. 4 is an explanatory schematic view showing a modification of the rotary electrical machine according to Embodiment 1 of the invention.
Figure 5:
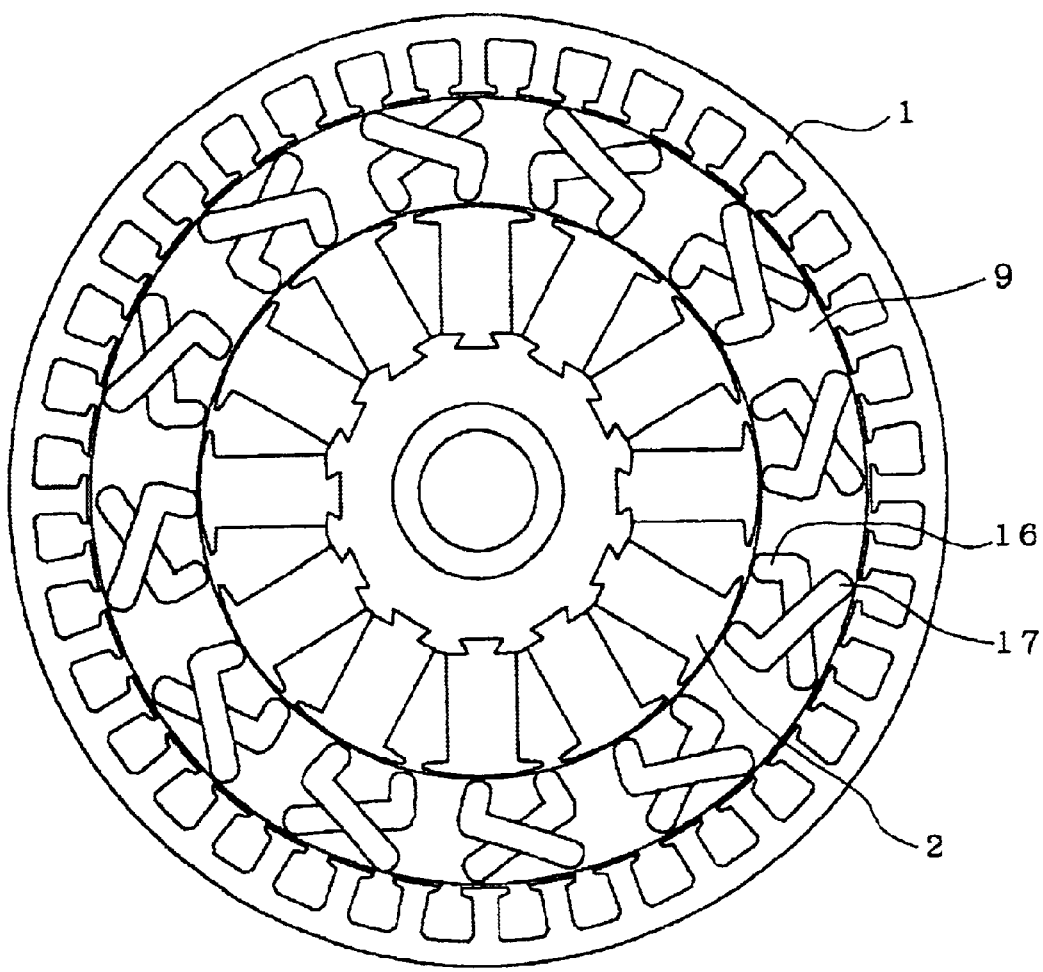
FIG. 5 is an explanatory schematic view showing a modification of the rotary electrical machine according to Embodiment 1 of the invention.
Figure 6:
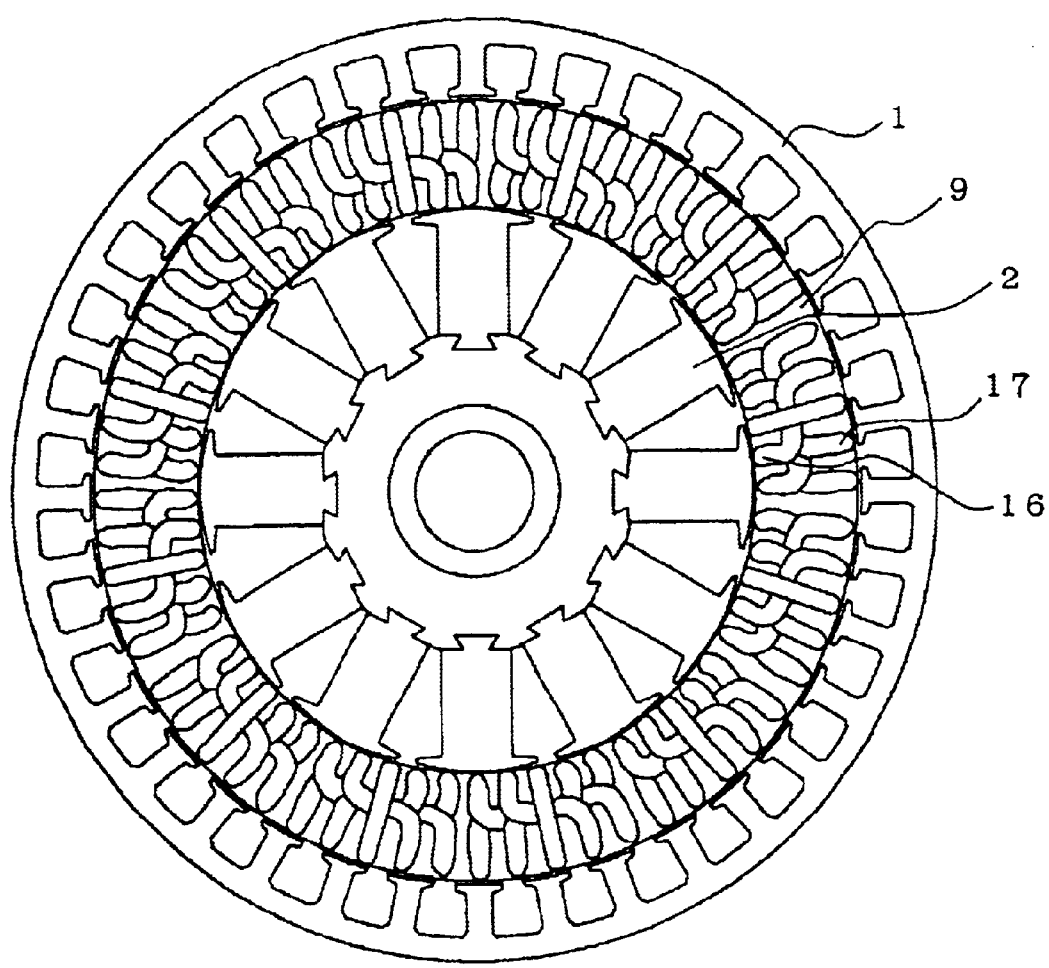
FIG. 6 is an explanatory schematic view showing a modification of the rotary electrical machine according to Embodiment 1 of the invention.

FIGS. 4 to 8 show modifications of the rotary electrical machine that works as described above. FIG. 4 is a modification of the rotary electric machine described referring to FIG. 3, and in which the armature 1 is changed to a five-phase winding, the rotor 9 has the six-phase inner coil 16 and the six-phase outer coil 17 in the same manner as in FIG. 3, and the inner coil 16 and the outer coil 17 are connected in reversed phase sequence. FIG. 5 shows a modification in which the rotor 9 has a four-phase winding, and the inner coil 16 and the outer coil 17 are connected in reversed phase sequence. FIG. 6 shows a modification in which the rotor 9 has a ten-phase winding, and the inner coil 16 and the outer coil 17 are connected in reversed phase sequence. FIG. 7 shows a modification in which the armature 1 has a five-phase winding, the rotor 9 has a four-phase winding, and the inner coil 16 and the outer coil 17 are connected in reversed phase sequence. FIG. 8 shows a modification in which the rotor 9 has a five-phase winding. In any of these modifications, the field 2 and the inner coil 16 form twelve poles, and the armature 1 and the outer coil 17 also form twelve poles. Thus, in a case where number of poles on the field 2 and that on the armature 1 are the same as described above, it is possible to increase the speed of the rotating magnetic field twice as high as the speed of the rotor 9. It is easy to connect the inner coil 16 and the outer coil 17 just by arranging them to have the same number of phases, and it is possible to reduce magnetic noise just by arranging the armature 1 and the rotor 9 to have different numbers of phases.

In each of the foregoing modifications, air gaps exist both at the internal diameter and the external diameter of the rotor 9. Therefore, it is advantageous to decrease the difference in effective areas of the air gap and decrease the difference in magnetic flux density in the air gap by increasing axial length of the field core 7 on the internal diameter side than that of the armature core 3 on the external diameter side. Although the field 2 is formed with the field coil 8 wound round the projecting pole portion 7b of the field core 7 in the foregoing description, it is also preferable that plural magnetic poles are formed by one field coil using a claw pole type field. Further, it is also preferable to simplify the structure using a permanent magnet as the field 2. In particular, since the field 2 is a stator, it is extremely easy to use the permanent magnet.

As shown in FIG. 9, it is possible to effectively cool the inner coil 16 and the outer coil 17 by extending the inner coil 16 and the outer coil 17 further in axial direction from the end face of the rotor core 15 and forming an air gap 23 between the connecting portion 19 and the rotor core 15. When using straight angle lines are employed in the inner coil 16, the outer coil 17 and the connecting portion 19, the connecting portion 19 forms a fan and it is possible to cool the armature coil 4 using fanning effect. It is also preferable to form integrally the short-circuiting ring 18 and fan in one unit.

It is effective that slots, in which the inner coil 16 and the outer coil 17 both provided on the rotor 9 are inserted, are skewed to the rotary shaft 12. The skewed inner coil 16 corrects the variation in magnetic flux of the field 2 so that an electric current flowing through the inner coil 16 becomes closer to a sine wave. Further, the skewed outer coil 17 can bring magnetic flux distribution in the air gap between the outer coil 17 and the armature 1 nearly a sine wave. Furthermore, if the inner coil 16 and the outer coil 17 of the rotor 9 and the short-circuiting ring 18 are formed by aluminum casting, it is possible to manufacture the rotor 9 more easily.

When the inner coil 16 and the outer coil 17 of the rotor 9 are connected as shown in FIG. 3, the magnetic flux of the inner coil 16 and that of the outer coil 17 interfere with each other. Accordingly, the magnetic flux does not flow in the middle part between u-phase of the inner coil 16 and U-phase of the outer coil 17. Therefore, it is possible to lighten the core at this portion, and, for example, when providing the screw 14 for fixing the rotor 9 at this portion, it possible to obtain a fitting structure not negatively influencing on the characteristics at all. It is further possible to improve the cooling effect by providing an air hole in the middle part of the u-phase and U-phase.

Embodiment 2

Figure 10:
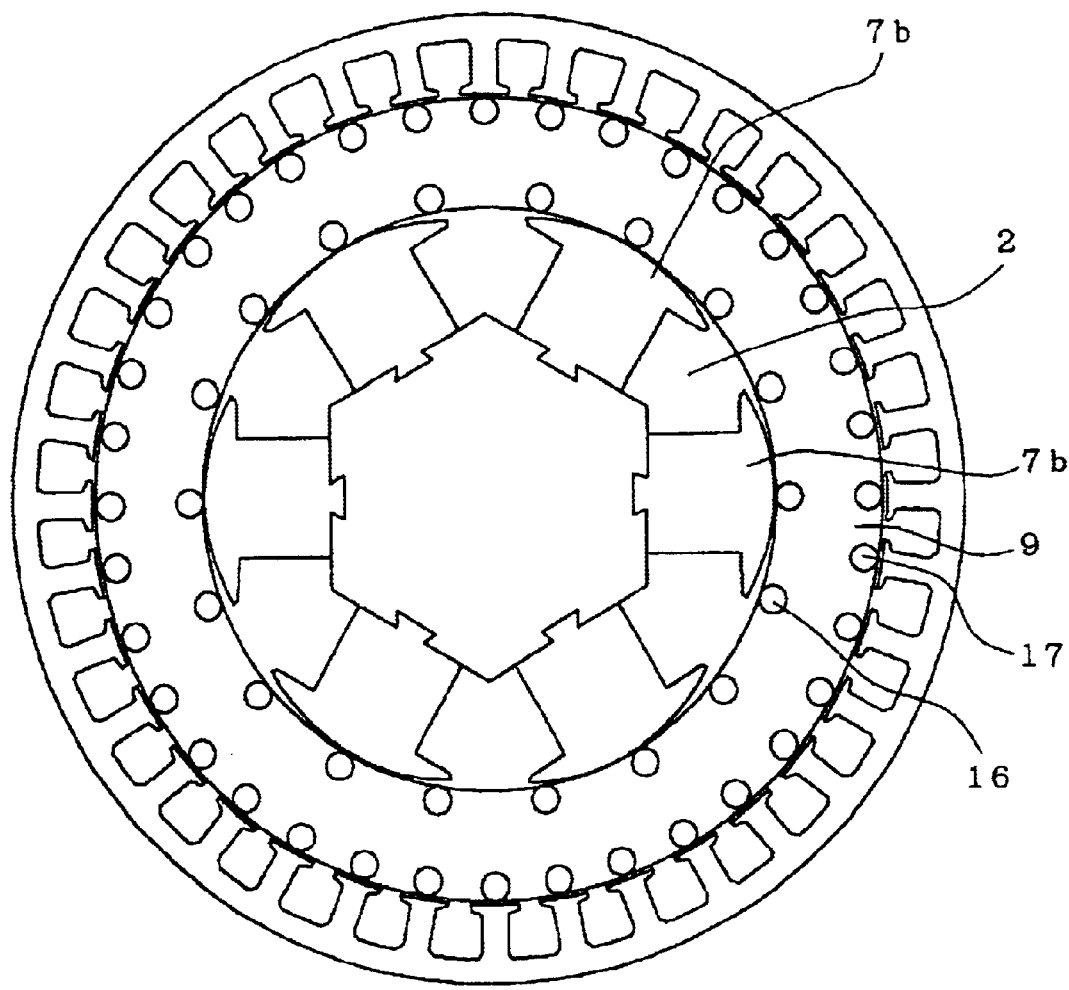
FIG. 10 is an explanatory schematic view showing a relation between stator and rotor of a rotary electrical machine according to Embodiment 2 of the invention.
Figure 11:
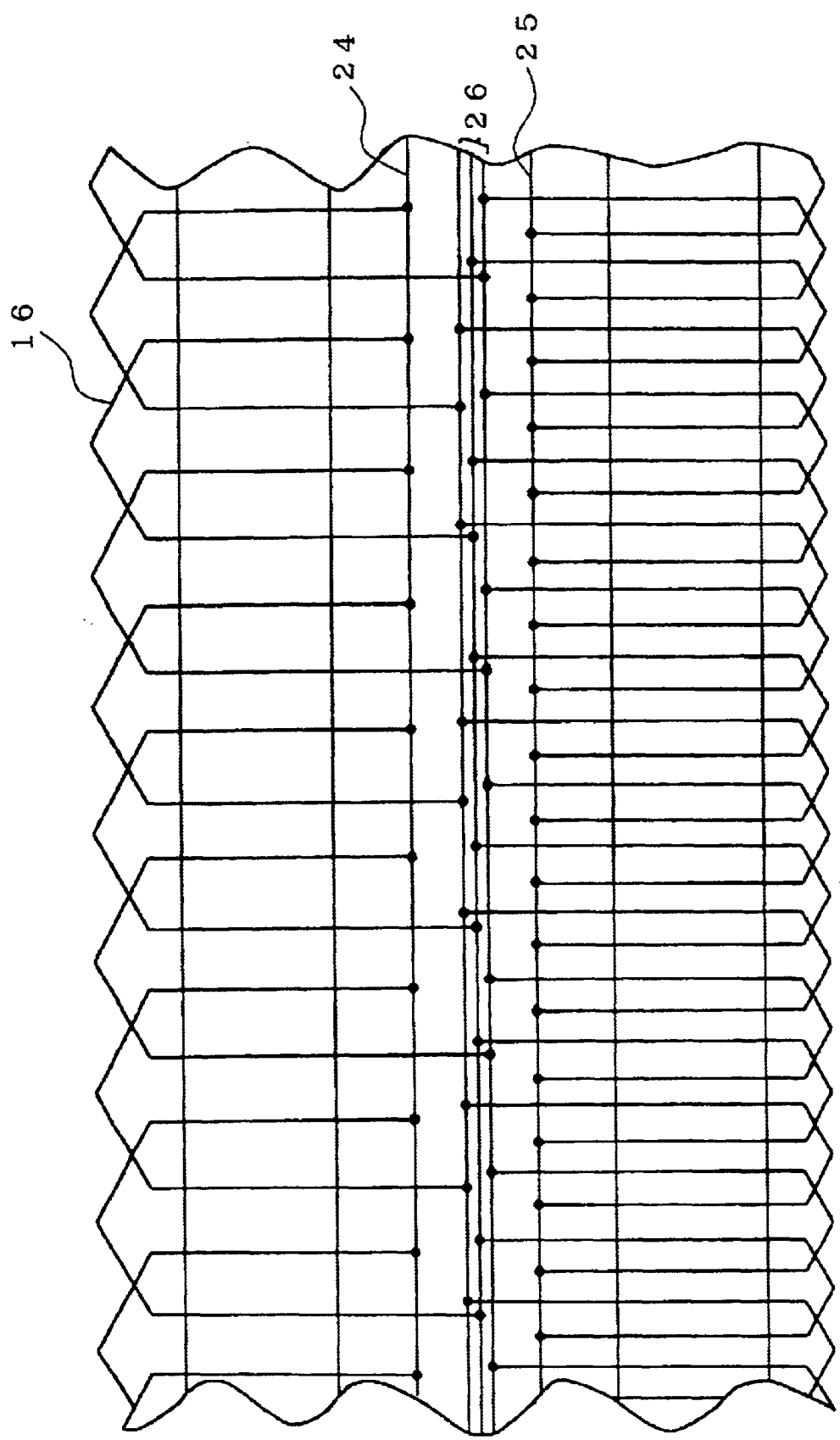
FIG. 11 is a connection diagram of a rotor winding of the rotary electrical machine according to Embodiment 2 of the invention.

FIGS. 10 and 11 are to explain a rotary electrical machine according to Embodiment 2 of the invention. FIG. 10 is an explanatory schematic view showing a relation between stator and rotor, and FIG. 11 is a connection diagram of rotor coil. In this embodiment, it is proposed that the armature 1 and the field 2 forming the stator have different numbers of poles, based on which number of conductors and connection of the inner coil 16 and outer coil 17 of the rotor 9 are changed as accordingly.

FIG. 10 shows an arrangement in which the projecting pole portion 7b of the field 2 is six-pole, number of coils of the armature 1 is thirty-six, and a twelve-pole three-phase coil is used. In the rotor 9, the inner coil 16 is three-phase and forms a six-pole coil in the same manner as the field 2, and the outer coil 17 is twelve-pole in the same manner as the armature 1 and forms a three-phase coil, and they are connected as shown in FIG. 11. In FIG. 11, winding ends on one side of the inner coil 16 are connected to a neutral point 24, and winding ends on the other side are connected to the respective phases of common lines 26, thus forming a star connection. Winding ends on one side of the outer coil 17 are connected to a neutral point 25, and winding ends on the other side are connected to the respective phases of the common lines 26, thus forming a star connection.

In the mentioned arrangement, when number of poles of the field is Pa and the rotating speed of the rotor 9 is N, an electric current of a frequency expressed by f=Npa/2 is generated at the inner coil 16, and this electric current is supplied to the outer coil 17. When this electric current flows through the outer coil 17, supposing that number of poles on the armature side is Pb, the rotating speed of the field by means of the outer coil 17 with respect to the rotor 9 is expressed n=f/(Pb/2). Accordingly, if the outer coil 17 is connected to the inner coil 16 with in reversed phase sequence in the same manner as in the foregoing Embodiment 1, the rotating speed of the field by means of the outer coil 17 is increased to N(1+Pa/Pb), and if the outer coil 17 is connected to the inner coil 16 in the same phase sequence, the rotating speed of the field is reduced to N(1−Pa/Pb).

As described above, in the rotary electrical machine according to Embodiment 2 of the invention, the rotating speed of the rotating magnetic field can be set to be higher or lower than the rotating speed of the rotor 9 depending on whether the inner coil 16 and the outer coil 17 are connected in reversed phase sequence or in the same phase sequence. When they are connected in reversed phase sequence, a generator of high output power or a generator of small magnetic noise can be obtained by increasing the rotating speed of the magnetic field in the same manner as in the foregoing Embodiment 1. On the other hand, when they are connected in the same phase sequence and the machine is used as a synchronous generator, an electric motor of a rotating speed higher than the frequency of electric power supplied to the armature coil 4 can be obtained.

The foregoing advantages are achieved due to a difference between number of poles of the field 2 and that of poles of the armature 1. Note that number of poles of the field 2 and the armature 1 and that of phases of the rotor 9 are not limited. For example, when number of poles of the respective coils of the rotor is the same as that of the field 2 and the armature 1, the same advantages are achieved even when the rotor 9 is four-phase, five-phase, or multi-phase of more than five-phase, and it is also possible to reduce magnetic noise by establishing number of phases of the armature 1 and the rotor 9 not to be any integral multiple.

FIG. 18 shows the first and second coils connected in a same phase sequence (note that the connection order of coil 16 is different from that in FIG. 11).

Embodiment 3

Figure 12:
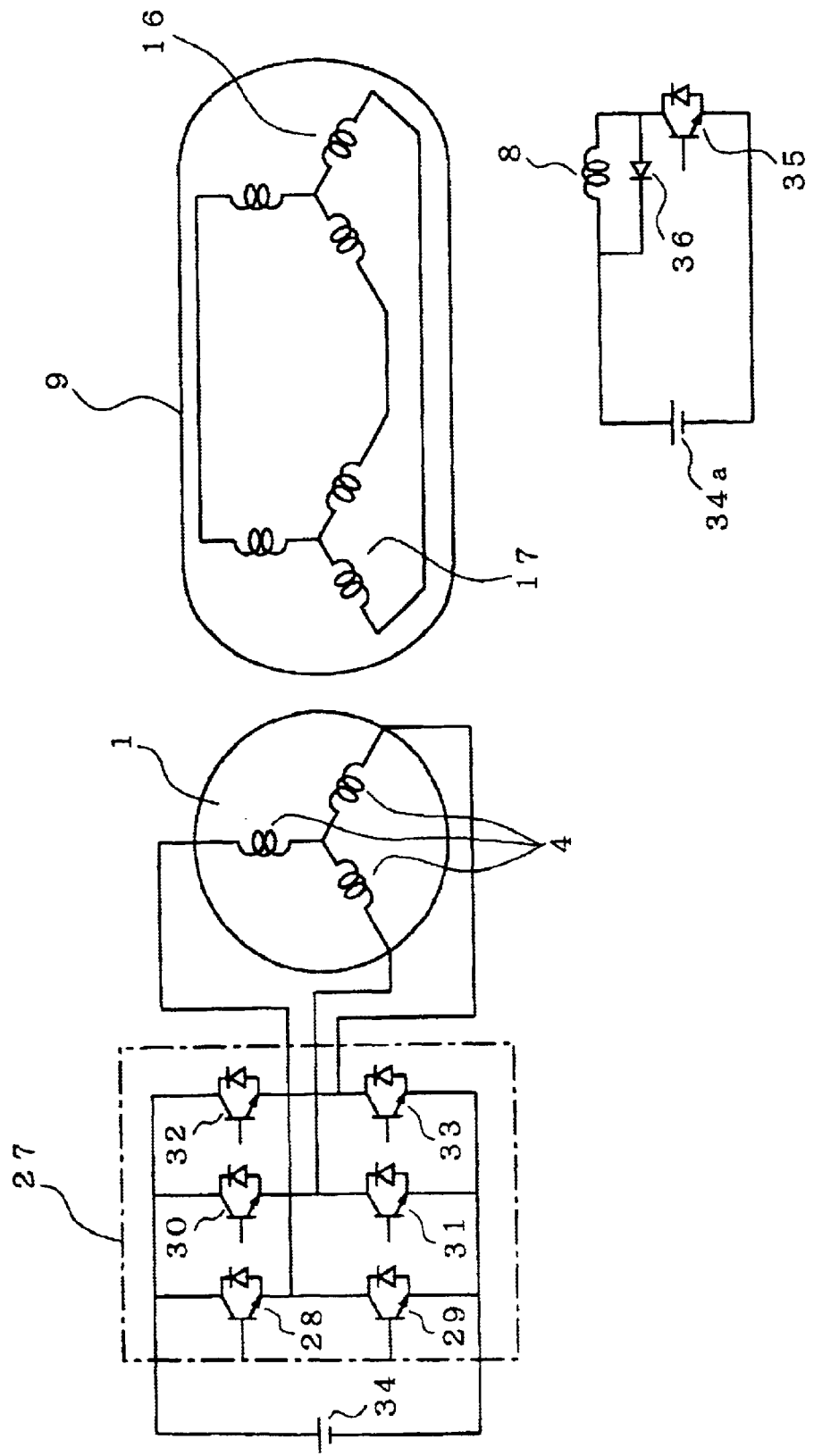
FIG. 12 is a circuit diagram of a rotary electrical machine according to Embodiment 3 of the invention.

FIG. 12 is a circuit diagram of a rotary electrical machine according to Embodiment 3 of the invention, and as partly described in the foregoing Embodiment 2, the rotary electrical machine is used as a synchronous generator in this embodiment. In the drawing, the three-phase armature coil 4 of the armature 1 is supplied with a three-phase power from an inverter 27 comprised of a switching element 28 to 33, and this inverter 27 is supplied with a power from a power supply 34. The field coil 8 is supplied with a field current from a direct-current power supply 34a, and value of the field current is controlled by a switching element 35. The rotor 9 is provided with the inner coil 16 and the outer coil 17, and the inner coil 16 and the outer coil 17 are connected as described in the foregoing Embodiment 1 or 2.

When the rotary electrical machine is used as a synchronous generator like this, in a case where the inner coil 16 and the outer coil 17 of the rotor 9 are connected in reversed phase sequence and the armature 1 and the field 2 have the same number of poles, it is possible to use the machine as a synchronous generator whose number of poles is twice for the same reason as described in the foregoing Embodiment 1. In a case where the armature 1 and the field 2 have different numbers of poles, it is possible to use the machine as an electric motor of high torque by increasing or decreasing the speed corresponding to a pole number ratio of the armature 1 to the field 2 for the same reason as described in the foregoing Embodiment 2. This electric motor does not start when the rotor 9 is locked with a heavy load, and it is therefore preferable to start the electric motor by controlling a frequency of the inverter 27 at the time of starting and synchronously drive the electric motor after starting the electric motor.

Embodiment 4

Figure 13:
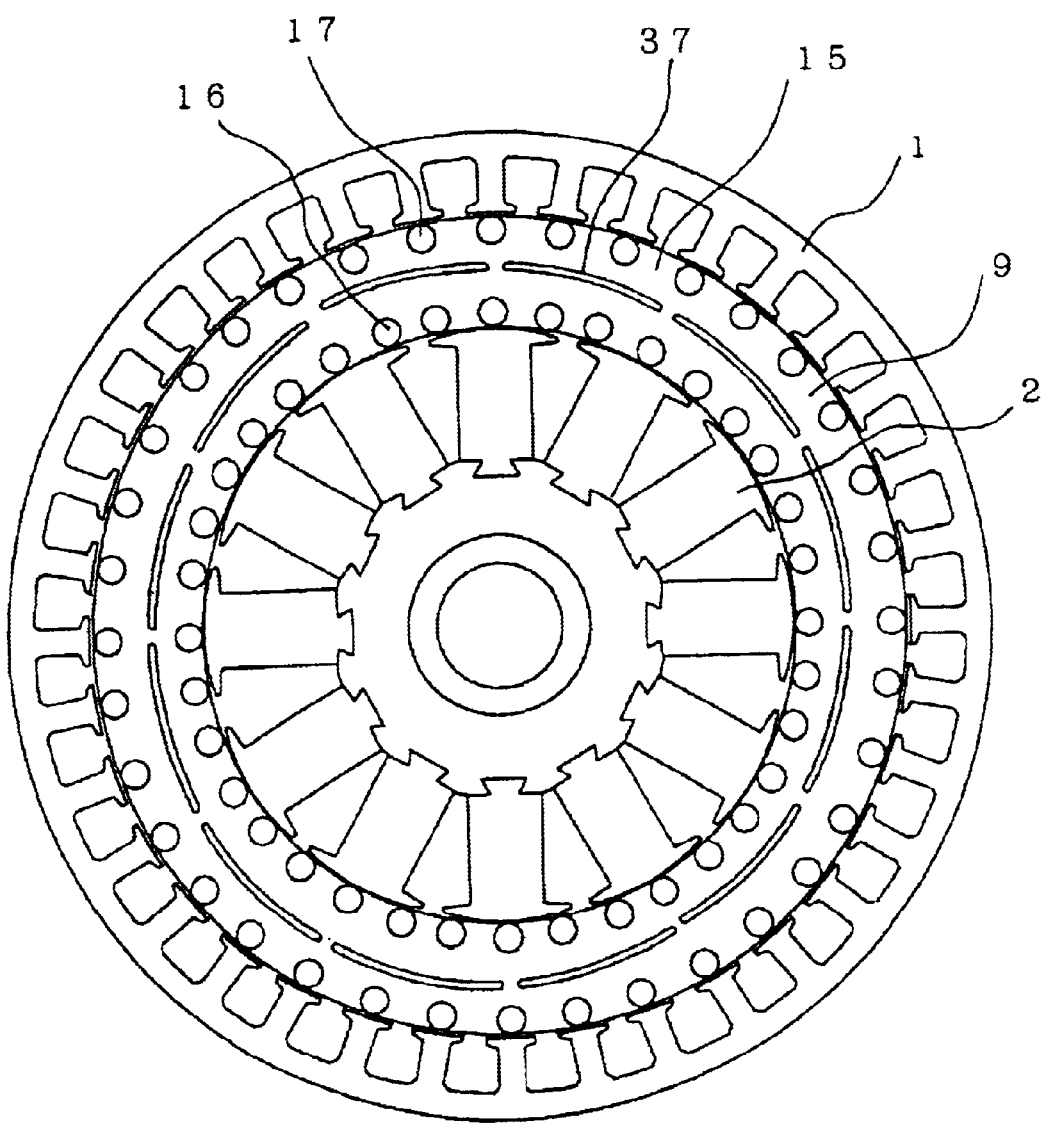
FIG. 13 is an explanatory schematic view of a rotary electrical machine according to Embodiment 4 of the invention.
Figure 14:
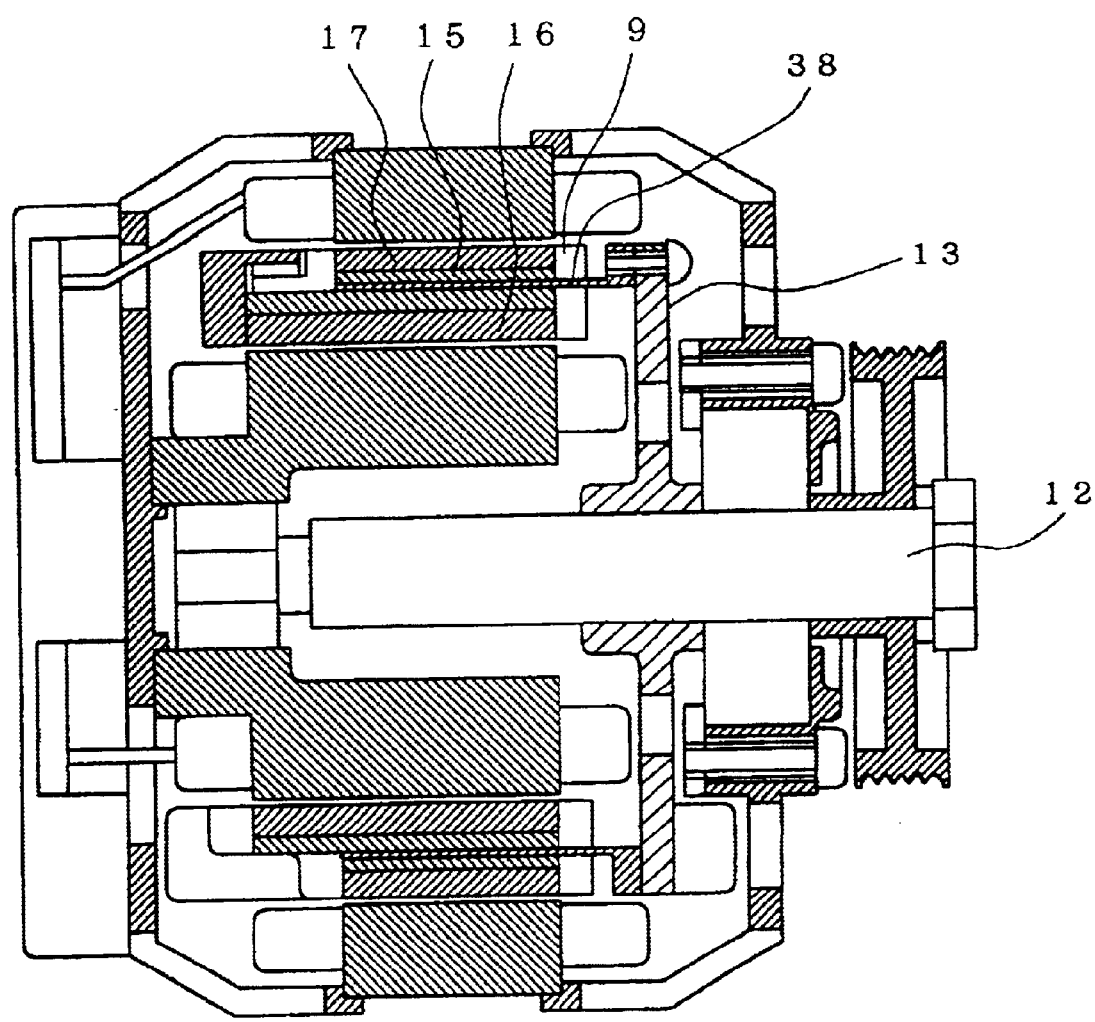
FIG. 14 is a sectional view of the rotary electrical machine according to Embodiment 4 of the invention.

FIGS. 13 and 14 are to explain a rotary electrical machine according to Embodiment 4 of the invention. The rotor core 15 of the rotor 9 is provided with slits 37 in circumferential direction in FIG. 13. By employing such a structure, magnetic flux from the field 2 and the magnetic flux generated by the electric current of the inner coil 16 do not influence a magnetic flux waveform formed by the outer coil 17, irregularity in voltage waveform of the armature coil 4 is restrained. Further, mutual interference between the magnetic flux generated by the inner coil 16 and the magnetic flux generated by the outer coil 17 is reduced, and magnetic noise is also reduced. Furthermore, as a result of embedding a non-magnetic electric conductor in the slits 37, an eddy current flows through the non-magnetic electric conductor, thereby increasing the required effect.

In FIG. 14, the non-magnetic electric conductor 38 is extended and joined to the disk portion 13 fixed to the rotary shaft 12, and the rotor 9 is held on the rotary shaft 12 through the non-magnetic electric conductor 38 and is driven. As the result of using the non-magnetic electric conductor 38 as described above, the rotor 9 and the rotary shaft 12 can be easily joined without providing any internal screw on the rotor core 15 composed of laminated iron plate.

Embodiment 5

Figure 15:
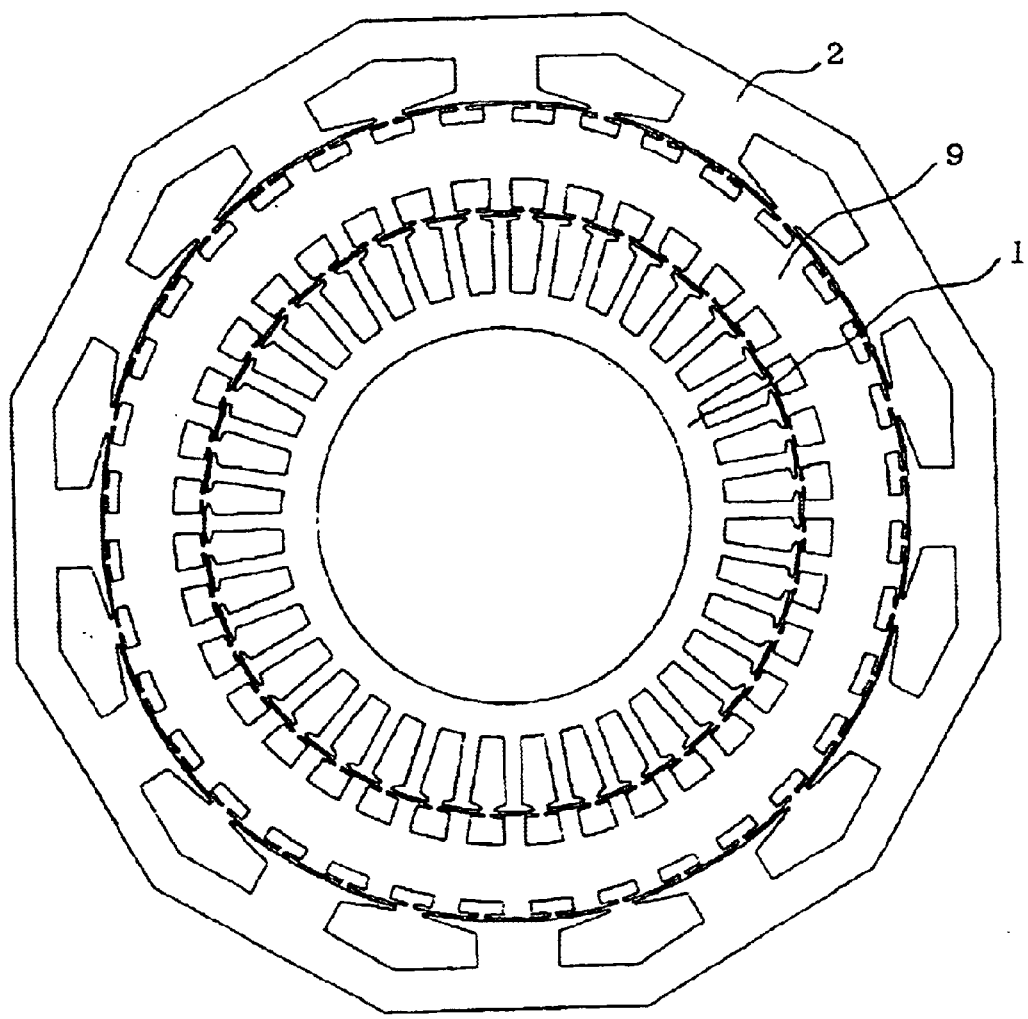
FIG. 15 is an explanatory schematic view explaining a structure of a rotary electrical machine according to Embodiment 5 of the invention.

FIG. 15 is an explanatory schematic view to explain a structure of a rotary electrical machine according to Embodiment 5 of the invention. In each of the foregoing embodiments, the armature 1 serving as a stator is disposed on the external diameter side, the field 2 forming the same stator is disposed on the internal diameter side, and the rotor 9 rotates between the armature 1 and the field 2. On the other hand, in this embodiment, as shown in FIG. 15, the field 2 is disposed on the external diameter side, the armature 1 is disposed on the internal diameter side, and the rotor 9 rotates between the field 2 and the armature 1. In some cases, disposing the field 2 on the external diameter side is more advantageous depending on the structure of the rotary electrical machine, and the same advantages as described in each of the foregoing embodiments are also achieved in such a structure.

Embodiment 6

Figure 16:
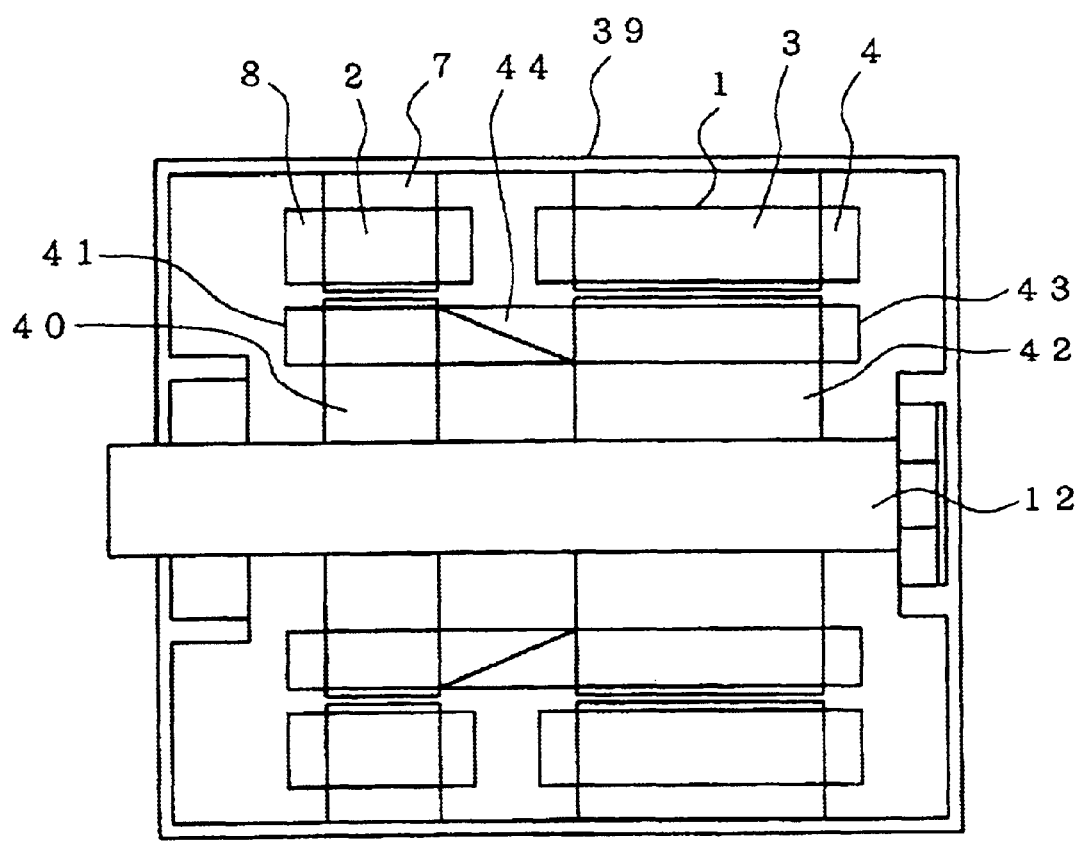
FIG. 16 is a schematic view explaining a rotary electrical machine according to Embodiment 6 of the invention.

FIG. 16 is a schematic view of a rotary electrical machine according to Embodiment 6 of the invention, and in which the armature 1 and the field 2 are disposed in axial direction. The armature core 3 having the armature coil 4 and the field core 7 having the field coil 8 are disposed in axial direction on the internal diameter of a yoke 39. A first rotor core 40 is provided with a multi-phase first rotor coil 41, and a second rotor core 42 facing the internal diameter of the armature core 3 is provided with a multi-phase second rotor coil 43. The first rotor coil 41 and the second rotor coil 43 are connected at a connecting portion 44.

The first rotor coil 41 corresponds to the inner coil 16 in the foregoing Embodiment 1, and the second rotor coil 43 corresponds to the outer coil 17. In the connecting portion 44, in the same manner as the connecting portion 19 in Embodiments 1 and 2, the second rotor coil 43 is connected to the first rotor coil 41 in reversed phase sequence or in the same phase sequence. Even in the rotary electrical machine having such a structure, so long as the armature 1 and the field 2 have the same number of poles and the first rotor coil 41 and the second rotor coil 43 are connected in reverses phase sequence, the rotating speed of the rotating magnetic field generated by the second rotor coil 43 with respect to the armature 1 is twice as high as the rotating speed of the rotary shaft 12, and the same advantages as described in the foregoing Embodiment 1 are achieved. In addition, when numbers of poles of the armature 1 and the field 2 are established in the same manner as described in the foregoing Embodiment 2, the same advantages as described in Embodiment 2 are achieved.

Embodiment 7

Figure 17:
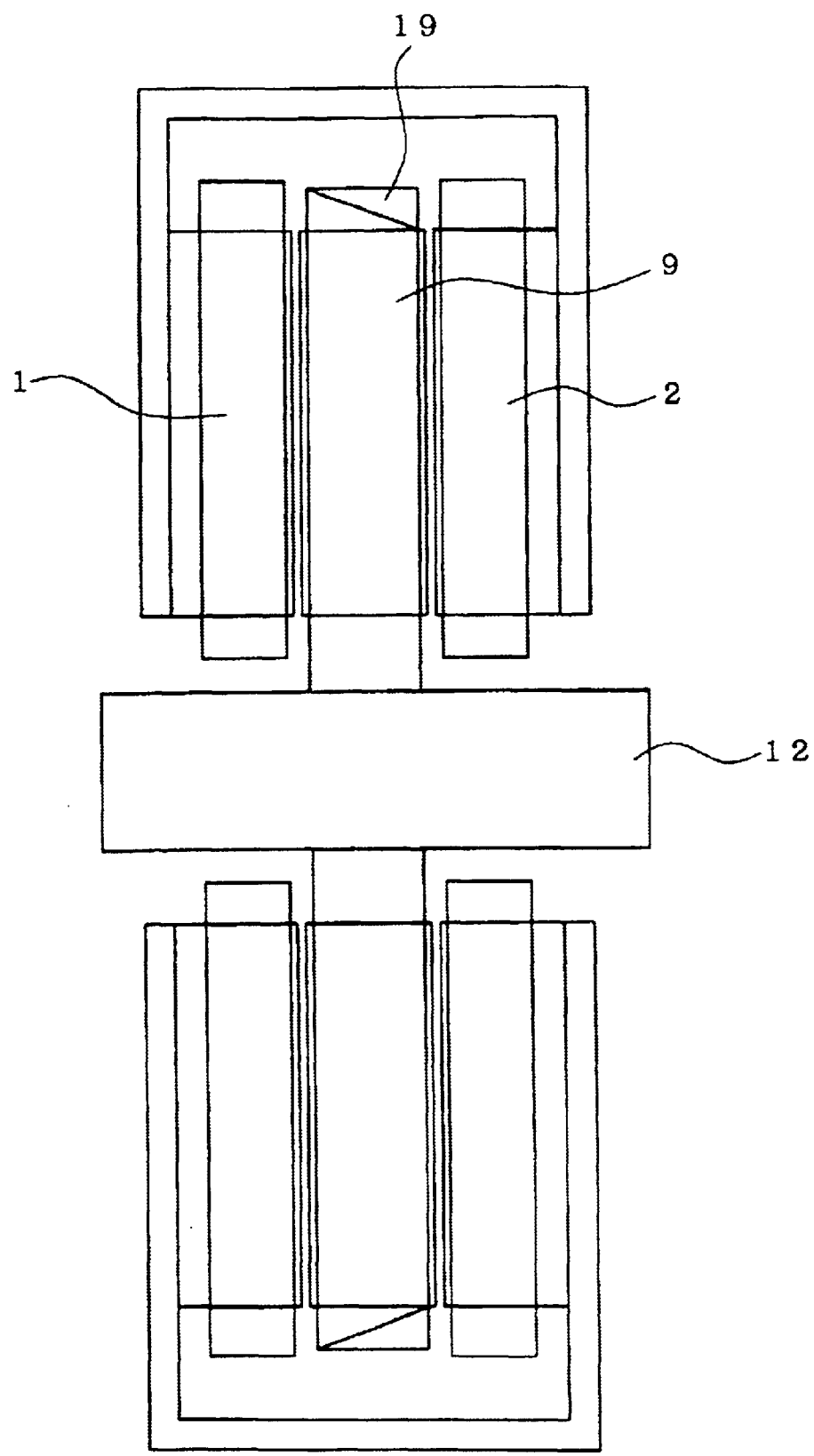
FIG. 17 is a schematic view explaining a rotary electrical machine according to Embodiment 7 of the invention.

FIG. 17 is a schematic view of a rotary electrical machine according to Embodiment 7 of the invention. In this embodiment, the armature 1 and the field 2 are disposed in parallel facing each other in axial direction of the rotary shaft 12. The rotor 9 is disposed between the armature 1 and the field 2 and rotates with a predetermined air gap between the rotor 9 and the armature 1 as well as between the rotor 9 and the field 2. Operation of this embodiment is the same as that of the foregoing Embodiment 1 in which the armature 1, the rotor 9, and the field 2 are disposed in radial direction. However, the air gap between the rotor 9 and the armature 1 and that between the rotor 9 and the field 2 are the same in area, and magnetic flux density is the same in the two air gaps. As a result, a highly efficient rotary electrical machine can be obtained. In such a structure, using a magnetic sintered material as the core, is more advantageous than using laminated iron plates (it is difficult to form slots on the laminated iron plates).

The present invention has additional features as follows:

It is preferable that the first coil and the second coil have plural phases and connected to each other so that number of magnetic poles formed by the field and the first coil and number of magnetic poles formed by the armature and the second coil are set to an equal value and the first coil and the second coil are connected in reversed phase sequence. As a result of such arrangement, a rotating field that rotates twice as high as the rotating speed of the rotor is obtained, thus a generator of high output power is obtained. Further it is also possible to obtain a rotary electrical machine of low magnetic noise by reducing the rotating speed of the rotor to a half, small sizing the machine, and reducing magnetic flux quantity.

It is preferable that the first coil and the second coil have plural phases and connected to each other so that number of magnetic poles formed by the field and the first coil and number of magnetic poles formed by the armature and the second coil are set to a different value and the phases of the first coil and the second coil are connected in reversed phase sequence. As a result of such arrangement, it is possible to increase the rotating speed of the rotating magnetic field by (1+pole number ratio) as compared with the rotor, and it is possible to increase the output power of the generator and small size the generator.

It is preferable that the first coil and the second coil have plural phases and connected to each other so that number of magnetic poles formed by the field and the first coil and number of magnetic poles formed by the armature and the second coil are set to a different value and the first coil and the second coil are connected in the same phase sequence. As a result of such arrangement, it is possible to obtain a synchronous generator of a rotating speed higher than a frequency of electric power given to the armature coil.

It is preferable that the field, the rotor, and the armature are disposed in order in radial direction with air gaps between them. As a result of such arrangement, it is possible to obtain a rotary electrical machine having a configuration suitable for a rotary electrical machine for vehicle, etc.

It is preferable that the rotary electrical machine includes a field core forming a magnetic path of the field, a rotor core forming a magnetic path of the rotor, and an armature core forming a magnetic path of the armature, in which a lamination layer of the field core, the rotor core, and the armature core disposed in order in radial direction has a thickness in axial direction so that an internal diameter side of the lamination layer is thicker. As a result of such arrangement, a difference between areas of the air gaps caused by a difference in radius is reduced, and a difference in magnetic flux density between the air gaps is reduced, and consequently, it is possible to obtain a highly efficient rotary electrical machine.

It is preferable that the rotor core forming the rotor has a non-magnetic material interposed between a portion having the first coil and a portion having the second coil. As a result of such arrangement, mutual interference of the magnetic flux of the first coil and the magnetic flux of the second coil is decreased, performance is improved, and magnetic noise is reduced.

It is preferable that the mentioned non-magnetic material is formed of slits provided on the rotor core. As a result of such arrangement, it is possible to assure required performance in a simple structure.

It is preferable that the mentioned non-magnetic material is composed of a non-magnetic metal embedded in the rotor core. As a result of such arrangement, an eddy current effectively reduces the mutual interference of the magnetic fluxes.

It is preferable that the non-magnetic metal embedded in the mentioned rotor core is disposed in such a manner as to protrude from the rotor and serve as a joint member for joining the rotor and a rotary shaft together. As a result of such arrangement, it is possible to join the rotor and the rotary shaft together without difficulty.

It is preferable that the field and the armature are disposed in axial direction of the rotary shaft, and the rotor is separated into a first rotor core facing the field and a second rotor core facing the armature, in which the first rotor core is provided with the first coil, and the second rotor core is provided with the second coil. As a result of such arrangement, it is possible to form the rotary electrical machine described in claims 1 to 4 without increasing external diameter thereof.

It is preferable that the first coil and the second coil of the rotor have the same number of phases. As a result of such arrangement, the first coil and the second coil are connected without difficulty, and the advantages described with respect to claims 1 to 4 are obtained.

It is preferable that the first coil and the second coil of the rotor have different number of phases from number of phases of the armature. As a result, it is possible to reduce magnetic noise.

It is preferable that the first coil and/or the second coil of the rotor are formed into a squirrel-cage by aluminum casting and are short-circuited by a short-circuiting ring on one end face of the rotor core, while the first coil and the second coil being connected by a connecting member on the other end face. As a result of such arrangement, it is possible to produce the rotary electrical machine described in claims 1 to 4 without difficulty.

It is preferable that the first coil and the second coil of the rotor are formed each of a bar-shaped conductor, the first coil and the second coil are short-circuited by a short-circuiting ring on one end face of the rotor core, and a connecting portion of the first coil and the second coil is formed on the other end face so as to be protruding from the end face of the rotor core by a predetermined length. As a result of such arrangement, cooling efficiency of each coil of the rotor is improved.

It is preferable that a fan is integrally formed with the short-circuiting ring. As a result of such arrangement, the armature coil is cooled in a simple structure.

It is preferable that lead wires of straight angle are used as the bar-shaped conductors. As a result of such arrangement, the connecting portion forms a fan, and it is possible to cool the armature coil without additionally mounting a new fan.

It is preferable that a portion of the rotor where magnetic flux is cancelled by mutual interference between the first coil and the second coil is provided with a fitting structure for fitting to the rotary shaft or a vent hole. As a result of such arrangement, it is possible to form a fitting structure and improve cooling effect without sacrificing the characteristics.

It is preferable that the field and the armature are disposed facing each other in axial direction of the rotary shaft, and the rotor is disposed between the field and the armature. As a result of such arrangement, the rotary electrical machine can be formed into a thin structure suitable for an electric motor.

It is preferable that a permanent magnet is used as the field. As a result of such arrangement, since the field serves as a stator, it is possible to obtain a rotary electrical machine of simple structure without paying much attention to strength.

What is claimed is:

1. A rotary electrical machine comprising:
   a stator comprising an armature and a field; and
   a rotor interposed and rotating between said armature and said field, said rotor comprising a first coil that is disposed at a portion facing said field and generates electric power by means of a magnetic field produced by said field, and a second coil that is disposed at a portion facing said armature, supplied with an electric current from said first coil, and provides a magnetic field to said armature,
   wherein said first coil and said second coil have a plurality of phases and are connected to each other so that a number of magnetic poles formed by said field and said first coil and a number of magnetic poles formed by said armature and said second coil are set to an equal value and said first coil and said second coil are connected in reversed phase sequence.

2. A rotary electrical machine comprising:

a stator comprising an armature and a field; and a rotor interposed and rotating between said armature and said field, said rotor comprising a first coil that is disposed at a portion facing said field and generates electric power by means of a magnetic field produced by said field, and a second coil that is disposed at a portion facing said armature, supplied with an electric current from said first coil, and provides a magnetic field to said armature, wherein the first coil and the second coil have a plurality of phases and are connected to each other so that a number of magnetic poles formed by the field and the first coil and a number of magnetic poles formed by the armature and the second coil are set to a different value and the phases of the first coil and the second coil are connected in reversed phase sequence.

3. A rotary electrical machine comprising:

a stator comprising an armature and a field; and a rotor interposed and rotating between said armature and said field, said rotor comprising a first coil that is disposed at a portion facing said field and generates electric power by means of a magnetic field produced by said field, and a second coil that is disposed at a portion facing said armature, supplied with an electric current from said first coil, and provides a magnetic field to said armature, wherein said first coil and said second coil have a plurality of phases and are connect to each other so that a number of magnetic poles formed by said field and said first coil and a number of magnetic poles formed by said armature and said second coil are set to a different value and said first coil and said second coil are connected in a same phase sequence.

4. The rotary electrical machine according to claim 1, wherein said field, said rotor, and said armature are disposed in order in radial direction with air gaps between them.

5. The rotary electrical machine according to claim 4 including a field core forming a magnetic path of said field, a rotor core forming a magnetic path of said rotor, and an armature core forming a magnetic path of said armature, wherein a lamination layer of said field core, said rotor core and said armature core disposed in order in radial direction has a thickness in axial direction so that an axial length of said field core on the internal diameter side is larger than that of said armature core on the external diameter side.

6. The rotary electrical machine according to claim 4, wherein said rotor core forming a magnetic path of said rotor has a non-magnetic material interposed between a portion having said first coil and a portion having said second coil.

7. The rotary electrical machine according to claim 6, wherein said non-magnetic material is comprised of slits provided on said rotor core.

8. The rotary electrical machine according to claim 6, wherein said non-magnetic material is composed of a non-magnetic metal embedded in said rotor core.

9. The rotary electrical machine according to claim 8, wherein said non-magnetic metal embedded in said rotor core is disposed in such a manner as to protrude from said rotor and serve as a joint member for joining the rotor and a rotary shaft together.

10. The rotary electrical machine according to claim 1, wherein said field and said armature are disposed in axial direction of said rotary shaft, and said rotor is separated into a first rotor core facing said field and a second rotor core facing said armature, and said first rotor core is provided with said first coil, and said second rotor core is provided with said second coil.

11. The rotary electrical machine according to claim 1, wherein said first coil and said second coil of said rotor have the same number of phases.

12. The rotary electrical machine according to claim 11, wherein said first coil and said second coil of said rotor have different number of phases from number of phases of said armature.

13. The rotary electrical machine according to claim 4, wherein said first coil and said second coil of said rotor are formed each of a bar-shaped conductor, said first coil and said second coil are short-circuited by a short-circuiting ring on one end face of said rotor core, and a connecting portion of said first coil and said second coil is formed on the other end face so as to be protruding from the end face of said rotor core by a predetermined length.

14. The rotary electrical machine according to claim 13, wherein lead wires of straight angle are used as the bar-shaped conductors.

15. The rotary electrical machine according to claim 4, wherein a portion of said rotor where magnetic flux is cancelled by mutual interference between said first coil and said second coil is provided with a fitting structure for fitting to said rotary shaft or a vent hole.

16. The rotary electrical machine according to claim 1, wherein said field and said armature are disposed facing each other in axial direction of said rotary shaft, and said rotor is disposed between said field and said armature.

17. The rotary electrical machine according to claim 1, wherein a magnetic flux generated by said first coil rotates in a direction opposite to a rotation direction of said rotor at a speed which is equal to a rotating speed of said rotor, and a magnetic flux generated by said second coil rotates in the same direction as the rotation direction of said rotor at a speed which is twice the rotating speed of said rotor.

18. The rotary electrical machine according to claim 2, wherein a magnetic flux generated by said first coil rotates in a direction opposite to a rotation direction of said rotor at a speed which is equal to a rotating speed of said rotor, and a magnetic flux generated by said second coil rotates in the same direction a the rotation direction of said rotor at a speed which is greater than the rotating speed of said rotor and corresponds to a pole number ratio of said armature to said second field.

19. The rotary electrical according to claim 3, wherein a magnetic flux generated by said first coil rotates in a direction opposite to a rotation direction of said rotor at a speed which is equal to a rotating speed of said rotor, and a magnetic flux generated by said second coil rotates in the same direction as the rotation direction of said rotor at a speed which is less than the rotating speed of said rotor and corresponds to a pole number ratio of said armature to said second field.

* * * * *